United States Patent [19]

Hatch

[11] 4,224,546
[45] Sep. 23, 1980

[54] PURIFICATION OF LIQUID METAL CURRENT COLLECTORS

[75] Inventor: Burton D. Hatch, Ballston Lake, N.Y.

[73] Assignee: The United States of America as represented by the Secretary of the Navy, Washington, D.C.

[21] Appl. No.: 909,311

[22] Filed: May 24, 1978

[51] Int. Cl.³ ............................................. H02K 31/00
[52] U.S. Cl. ..................................... 310/178; 310/219
[58] Field of Search ............... 310/178, 219, 112, 114, 310/127; 322/48; 318/253

[56] References Cited

U.S. PATENT DOCUMENTS

| | | | |
|---|---|---|---|
| 2,828,431 | 3/1958 | Klaudy | 310/178 |
| 3,211,936 | 10/1965 | Harvey | 310/219 |
| 3,831,049 | 8/1974 | Korotenko | 310/178 |
| 3,846,653 | 11/1974 | Korotenko | 310/178 |
| 4,027,183 | 5/1977 | Hatch | 310/178 |

Primary Examiner—R. Skudy
Attorney, Agent, or Firm—R. S. Sciascia; L. I. Shrago

[57] ABSTRACT

A method and means for continuously returning degassed and de-emulsified liquid metal to the collector sites of high speed acyclic generators is provided. Hydrodynamic pressures developed by the high speed rotating discs are employed to pump liquid current-carrying metal through a plurality of stationary passageways into an interiorly positioned rotating cup or channel where centrifugal forces return purified metal to the collector sites and retain the impure liquid metal.

1 Claim, 4 Drawing Figures

PURIFICATION OF LIQUID METAL CURRENT COLLECTORS

This invention concerns the in situ purification of liquid metal contained in high speed acyclic generators and, more particularly, accomplishing such purification without requiring liquid metal piping or auxiliary apparatus external to the generator.

In developing high speed acyclic generators it is essential to maintain good electrical connection between the rotating and stationary components of the armature circuit without requiring liquid metal piping or other liquid metal auxiliaries disposed outside of the machine. Solid brushes such as carbon and carbon composites have not been able to carry the inherent high current densities, provide low voltage drop and losses, and provide long service life at low cost. Liquid metals ideally provide very low voltage drops and low electrical losses, however, the fluid is degraded by oxidation and/or emulsification, i.e. mixing, with the gases immediately surrounding its free surfaces. Attempts to purify the liquid metal in acyclic generators include extracting a portion of the liquid metal from the collector, carrying it through piping to an external heat exchanger for cooling, and purifying it outside the machine before returning it through piping to the collector ring from which it was extracted. These pipes, heat exchanger, etc. are at the electrical potential of the collector ring, and as machine terminal voltages increase multiple collectors are required each having separate sets of electrically isolated pipes, coolers, etc. The complexity of this external system of pipes, etc. limits the voltage of practical machine designs. The present invention avoids the foregoing deficiencies by providing for the continuous de-emulsification and return of purified liquid metal to the collector sites at all operational speeds without recourse to any external components.

Accordingly, it is an object of the present invention to provide a method and means for purifying the current-carrying liquid metal in high speed generators such as acyclic generators which is entirely contained within the generators.

Another object of this invention is to provide a method and means for collecting liquid metal which is self-contained internally in a generator rotor and disposed at a number of points around the periphery of the electrical collector region thereof so as to continuously maintain a low resistance electrical path between the rotating disc and the stationary collector ring.

A further object of this invention is to provide a self-contained, batch-filled, electrically isolated and separately cooled electrical means for continuously de-emulsifying and returning a supply of purified liquid metal to the collector regions of high speed generators at all operational speeds.

Other objects, advantages and novel features of the invention will become apparent from the following detailed description thereof when considered in conjunction with the accompanying drawings in which like numerals represent like parts throughout and wherein.

The present invention, in general, provides grooves or passageways in high speed generator rotors by meamsn of which liquid metal is collected and redirected axially into the side of the generator rotating disc. Normally, the liquid metal in such generators has gases entrained therein which affect the current carrying capacity of the metal. As the mixture of liquid metal and gas is brought up to the rotational speed of the rotor, the substantial difference in density of the liquid metal relative to that of the inert centrifugal gas separates the liquid phase of the material from the gas phase, forcing the liquid radially outward to the bottom of an inverted cup-like cavity and forcing the gas radially inward away from the collector regions thus providing purified metal to the regions. The purified metal assures maximum electrical conduction between the disc and ring, and this is effectively maintained around the periphery of the rotor by continuous replenishment of the liquid metal to the collector sites. Centrifugal forces acting on the pure liquid metal are sufficient to retain the liquid metal in the collector region against the Lorentz expulsion forces so that continuous replenishment of pure liquid metal into the collector gap is achieved.

Figure 1:
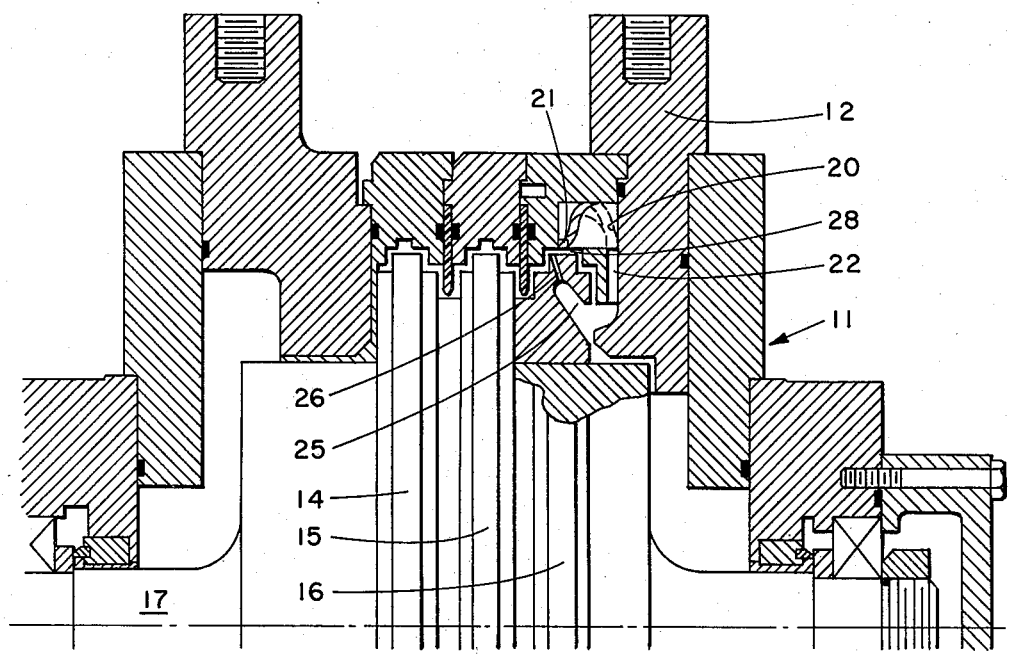
FIG. 1 is a sectional view partly cut away of a high speed generator rotor and stator having the de-emulsifying means of the present invention installed therein.
Figure 2:
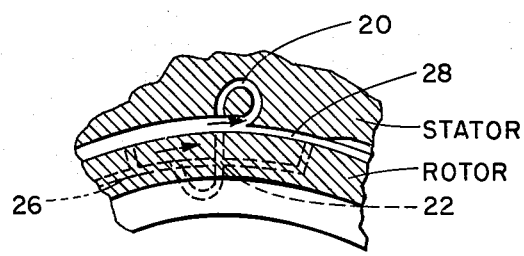
FIG. 2 is a fragmentary sectional view of the stator and rotor showing the extraction of the liquid metal from the rotor periphery.

Referring to the drawings, FIG. 1 is an overall view partly in section of the operative components of an acyclic generator 11 which illustrates an electrical stator collector ring 12 and rotor collector rings 14-16 which are mounted on a rotor 17. Ring 16 and stator 12 are modified as shown in the upper proportion of the figure to contain a spiral groove 20 leading from a liquid metal collector groove 21, a radial groove 22 which communicates with an enlarged cup-shaped annular groove 25 wherein liquid metal is now collected, and a radial passage 26 which communicates with collector region 28 which includes groove 20. FIG. 2 schematically illustrates passages 20, 22 and 26 by means of which liquid metal is extracted from collector region 28, degassed and de-emulsified, and redirected back to the collector region.

Figure 3:
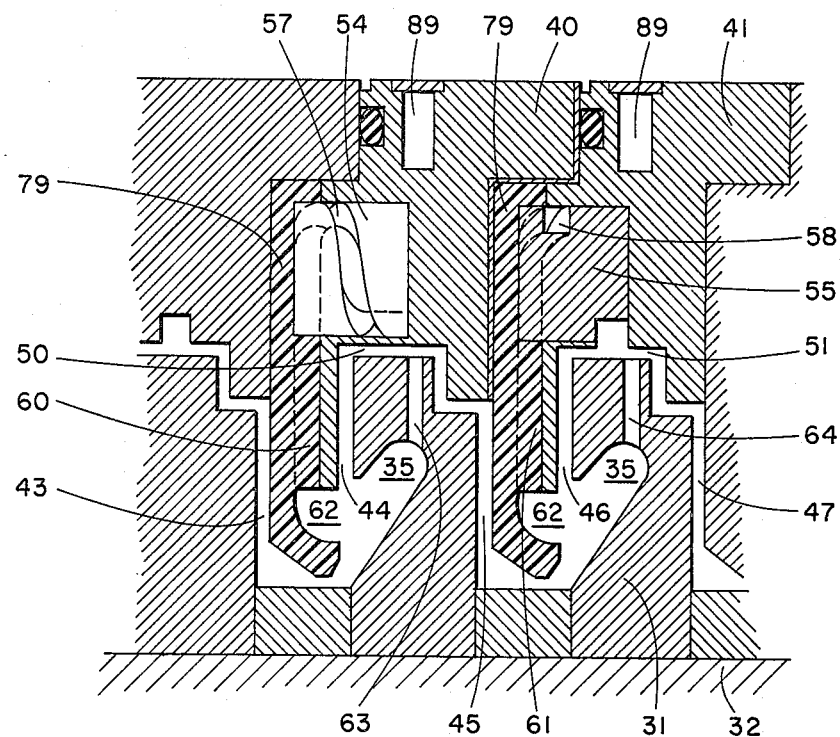
FIG. 3 is a sectional view of the internal high speed generator components showing the manner in which liquid metal is radially displaced toward the rotor axis and purified by centrifugal force.
Figure 4:
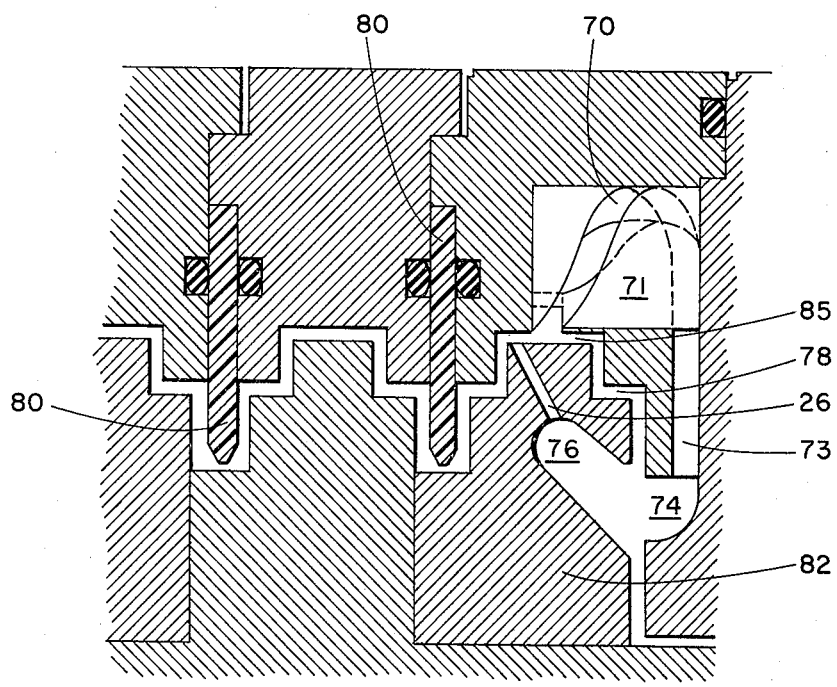
FIG. 4 is an alternate embodiment of the extraction and purifying method and means shown in FIG. 3.

FIG. 3 shows the passages and de-emulsifying areas of the invention in greater detail and includes a pair of collector rings 30 and 31 mounted on a rotor 32 with the collector rings each containing an annular groove or cup 35. A pair of stator collector rings 40 and 41 are configured in relation to rotor rings 30 and 31 to form liquid metal passages 43-47 and liquid metal collector regions 50 and 51. A pair of plugs 54 and 55 are inserted in stator rings 40 and 41 and contain grooves 57 and 58 for extracting liquid metal and impurities therein from collector regions 50 and 51. The spiral grooves extract the liquid metal by providing an outlet for the centrifugally driven liquid, as shown in FIG. 2, and redirect the liquid metal and impurities radially inward through a pair of passages 60 and 61 which communicate with a curved groove 62 in the stator rings opposite collector cup 35. Heavier substantially pure liquid metal is driven by centrifugal force to the collector regions via radial passages 63 and 64 which communicate between cups 35 and the collector regions while lighter, impure liquid metal is retained in the lower volumes formed by grooves 62 and cups 35 adjacent rotor 32. FIG. 4 presents an alternate arrangement of the invention wherein a plurality of spiral stator grooves 70 are contained in plugs 71, only one of which is shown, which direct liquid metal and impurities in an opposite axial direction to that in the embodiment of FIG. 3 through radial passages 73 into an annular cup 74. Lighter liquid metal containing impurities is retained adjacent the rotor in cup 74 and the adjoining volume of a deep annular groove 76 while heavier, more pure, liquid metal is returned to the collector region via stepped passages 78. Stationary insulation spacers 79 in FIG. 3 and 80 in FIG. 4 mechanically and electrically separate the liquid metal in one rotating collector ring from that in an adjacent collector ring.

More specifically, as the mixture of liquid metal and impurities, which primarily are gas, is brought up to the rotational speed of collector rings 30 and 31 in FIG. 3 and 82 in FIG. 4, and in grooves 62 and 76, the great difference in density in the liquid metal relative to that of the inert gas centrifugally separates the liquid phase of the material from the gaseous phase, forcing the liquid portion radially outward to the remote portion of the adjacent cup and the gaseous portion radially inward where it is retained or drained off thus purifying the liquid metal. Radial passageways 44 and 46 in rotating rings 30 and 31 provide a conduit for the liquid metal since the centrifugal force generated as the collector rings come up to full rotational speed forces the purified liquid metal radially outward through each of these passages and into annular collector regions 50 and 51 at a number of points around the periphery of the rings. At each of these points, 50 and 51 in FIG. 3 and 85 in FIG. 4, electrical conduction between the collector rings and the stators occurs through the pure liquid metal. This effectively maintains by continuous pure liquid metal replenishments a well distributed, low electrical resistance path between the rotating disc and the stationary ring. At all operational speeds of the generator, the centrifugal forces on the liquid metal at the periphery of the rotating collector rings are sufficient to retain the liquid metal in the collector region against the Lorentz expulsion forces so that continuous replenishment of pure liquid metal into the collector gap to replace the mixture of liquid metal and gases which would otherwise be present at generator speeds is accomplished. In addition, the liquid metal volume required in the full flow circuit—e.g. 54, 79, 60, 62, 63 and in the peripheral collector region between the disc and the collector ring is small. Cooling is separately provided by circulating a cooling fluid in circular passageways such as 89 in stationary collector rings 40 and 41.

The present invention thus provides a means for continuously de-emulsifying and returning a supply of purified liquid metal to the collector regions of acyclic generators at all operational speeds. The means is self-contained, batch-filled, electrically isolated and separately cooled to minimize the quantity of liquid metal required and to eliminate the need for plumbing, cleaning and cooling chambers, pumps, valves, etc. outside of the machine. In the embodiments shown, plugs 54, 55 and 71 extract liquid metal and are symmetrically spaced preferably 8" to 10" apart in the stator collector rings and disposed in their inlets substantially centered in the collector regions. The spacing may be varied as required depending on the frequency of degassing desired. The passages or spiral grooves in the plugs transport the liquid metal axially either forward or aft of the collector regions and then direct it radially toward the rotor shaft to internally formed annular cups 62 and 74 in the respective stator. The plugs or liquid metal extractors preferably are made of phosphor bronze but could be made or iron of alumina. Insulators 79 and 80 preferably are made of a composition of epoxy and fiberglass. Passageways 44 and 46 are used primarily for initially charging the collector regions with liquid metal. The gas which collects in the cavity formed by cups 62 and 35 forms an insulating medium along the inner end of insulators 79 which further electrically separates adjacent rotor and stator rings.

The principal features of the invention include the preservation and utilization of the dynamic pressure generated in the liquid metal, i.e. tangential to the periphery of the rotor collector ring, through intercepting the fluid flow by a curved path which is itself nearly tangential to the flow of fluid around the periphery of the rotor collector. By providing a spiraled path, the intercepted and extracted portion of the liquid metal moves axially a sufficient distance to clear the salient portions of the rotating ring. The smooth change in direction of the flow of the extracted liquid metal in the plane of the rotating ring from tangential to radially inward provides a minimum of resistance to this transfer of liquid metal, as does the smooth inward radial flow and then axial flow of the liquid as it passes from the stationary passageway into the rotating cup in the side of the rotating ring. Entrained gases are centrifugally separated from the liquid metal in the rotating cup, and the rotational acceleration of the liquid metal in the cup and passageways of the ring return the liquid at full tangential speed to the electrical collector volume between the rotating ring and the stationary ring. A continuous supply of purified liquid metal to the electrical collector volume is provided at a number of points around the periphery so as to continuously maintain a low resistance electrical path between the rotor and the stator over a wide range of speeds including the very high speeds which acyclic generators beneficially require. Separating the cooling circuit from the liquid metal circuit permits the use of electrically non-conductive fluids to electrically isolate the various electrical collectors in acyclic machines.

Obviously, many modifications and variations of the invention are possible in the light of the foregoing teachings.

What is claimed is:

1. In an acyclic machine which uses liquid metal for current collection and includes a rotor, a stator, and a plurality of collector regions formed by a liquid plurality of rotor collector rings rotatable within respective stator collector rings, improved means for removing gas and impurities from the liquid metal comprising:
   means in said stator collector rings for insulating each stator collector ring from the adjacent stator collector ring; and
   a plurality of plugs inserted at spaced intervals along the inner surface of the end one of said stator collector rings,
   said plugs each having a groove for conducting liquid metal which includes an inlet tangent to said surface and aligned against the direction of rotation of the adjacent rotor collector ring at the end of said collector regions so that liquid metal is forced thereinto, and a radial passage remote from said inlet for directing said liquid metal radially inward,
   said end stator collector ring having a radial groove which is in register with said radial passages and an interior annular stator groove at the terminus of said radial groove for receiving and collecting liquid metal that is forced into said inlets by centrifugal force imparted by said adjacent rotor collector ring, the end one of said rotor collector rings having an annular groove communicating with said stator annular groove and angled radially outward therefrom for receiving and collecting degassed and de-emulsified liquid metal, said end rotor ring further having spaced substantially radial passages extending from the outer end of said rotor annular groove to the adjacent collector region at points remote from said inlets and said stator radial passages for resupplying liquid metal to said collector region, said stator and said rotor forming an interior passage communicating with said stator and rotor annular grooves for removing gases and impurities separated from said liquid metal by centrifugal force.

* * * * *